Patented Aug. 29, 1933

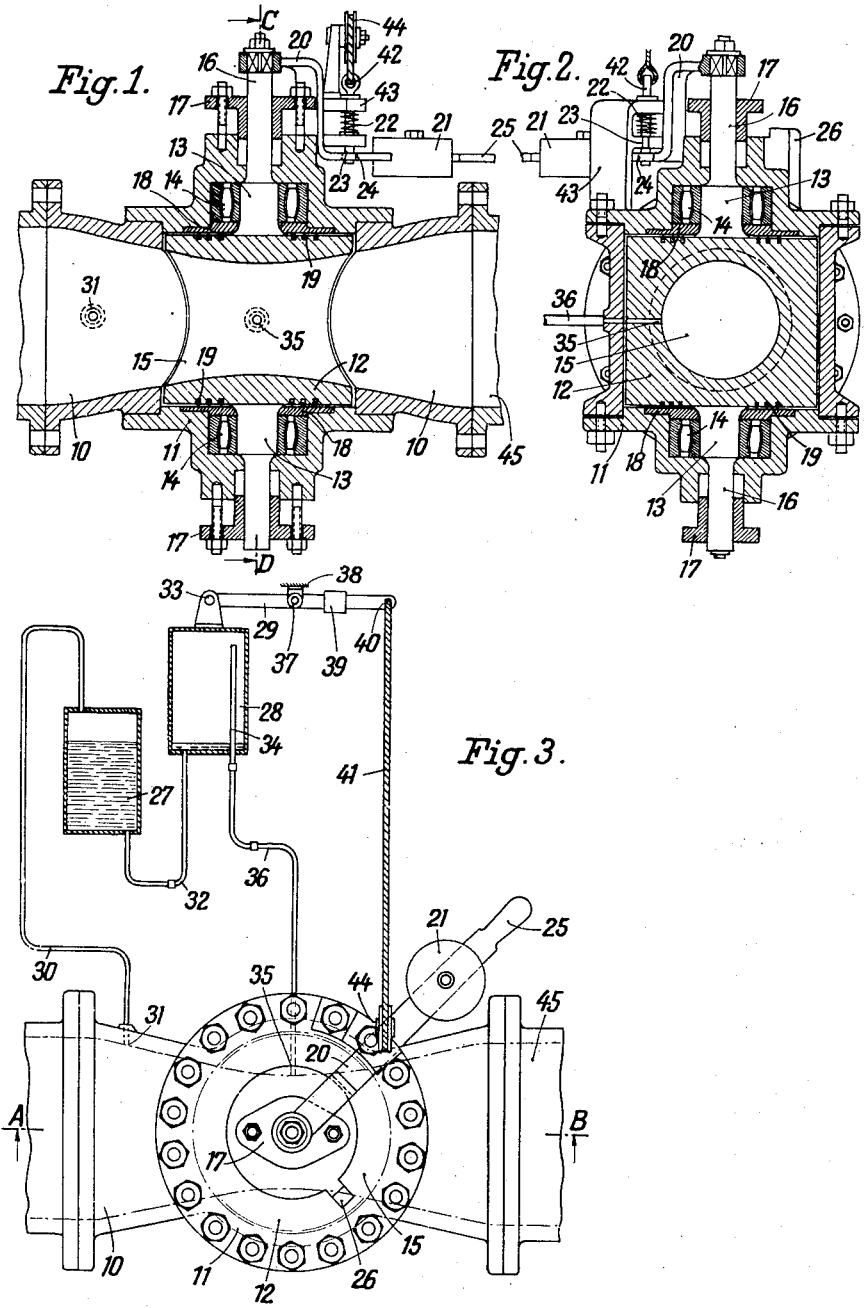

1,924,325

UNITED STATES PATENT OFFICE 1,924,325

FLUID CONTROLLING DEVICE

Bernhard Krämer, Halle on the Salle, Germany, assignor to the firm Elektrowerke Aktiengesellschaft, Berlin, Germany Application November 28, 1928, Serial No. 322,536, and in Germany November 28, 1927

2 Claims. (Cl. 251—113)

The invention concerns devices for regulation of the flow of elastic and non elastic fluids, as for example steam, air, water, or the like. The devices of this kind hitherto known, in their shut off position always close off completely the pipes or mains through which the fluid in question flows. The disadvantages of this, however, is that owing to the high resistance which the fluid, in the final closing position of the regulating agency, exerts on the latter, great frictional resistances have to be overcome and consequently great power is needed for the movement of such completely shutting off devices.

The quick closing valves hitherto used for example in steam ways, or pipes are very complicated. In addition in these devices great forces occur which may under certain conditions result in breakage of the pipe or main connected up.

The invention indicates a method in order, in the simplest and most reliable way, in case of breakage of driving fluid pipes, or for the purpose of shutting them off, to bring about such a throttling that for example in steam pipes or ways; on the one hand, if the pipe breaks an entire discharge of the boiler steam is prevented, and on the other hand, on quick closure, the wire drawn steam which reaches the engine is not sufficient to start the latter or to cause an engine already running to race. For this purpose the device according to the invention is so designed that the closing off agency is kept continuously freely movable, with such play or clearance in the casing that the quantity of fluid still passing in the closed position of the shut off device causes no considerable loss of the fluid or for example in the case of steam, causes no danger to human beings and plants.

The invention further affords the possibility, in case of breakage of a pipe or main before or behind the shut off agency, to bring the latter automatically into operation.

On the drawing the invention is shown, Fig. 1 being a vertical longitudinal section (sectional elevation) through the throttling or shut off device according to the invention through the line A—B of Fig. 3, the arrangement for automatically starting the throttle device being partly omitted, and other parts shown cut away. Fig. 2 shows a cross-section through the line C—D of Fig. 1. Fig. 3 is a plan view of the throttle device according to Fig. 1 certain parts being shown cut away, and in addition shows the arrangement for automatic starting of the throttle device, in case of pipe breakage, in part section.

In the casing 11 which is provided with outward expanding tapering connection 10 a plug cock 12 with pin or pivot 13 is mounted in ball or barrel bearings 14. The plug cock 12 is held in the casing 11, the connection 10 and the ball or barrel bearings 14 with a play or clearance of preferably 0.5 mm. width. The passage 15 in the plug 12 is designed after the manner of a Venturi nozzle. The pins or pivots 13 are provided externally with extension 16 and are made tight in the case 11 by stuffing boxes 17.

Owing to the clearance provided between the casing 11 the connecting socket 10 and the ball or barrel bearings 14, the plug cock 12 is kept permanently movable in the casing 11. Therefore even in the closed position of the plug 12 a certain quantity of steam can pass from one side of the plug to the other through the clearance existing between the casing 11 and the plug 12. In order, in spite of the free movability of the plug 12, that the quantity of steam passing through the clearance should not become too great, labyrinth packings 19 are provided between the plug 12 and the supporting plate 18 for the ball or barrel bearings 14.

On the free end of the one extension 16 of the pivot 13 an operating lever 20 is mounted by means of a square and provided with a slidable weight 21. In the open position of the plug 12 the lever 20 is held by a bolt 23 which is suitably under the action of a spring 22 and which engages in a recess 24 of the lever 20. If the plug 12 is to be moved out of the position shown in the drawing into its closing position, then the bolt 23 is antagonistically to the action of the spring 22, pulled out of the recess 2 in the lever 20 and the lever 20 is, by means of the handle 25, moved downwards by an angle of 90 degrees until it is brought against the stop 26 fitted on the casing 11.

The plug 12 can, however, also be automatically brought into its closing position by a device actuated by the Venturi effect of its passage 15. This device consists of two vesels 27 and 28, of which the vessel 27 is stationary and the vessel 28 on the contrary is fitted movably at one end of a lever 29. The lid of the vessel 27 is connected by a tube 30 with an opening 31 to the one connecting socket 10. The interiors of the two vessels 27 and 28 are further connected with each other by a flexible tube 32 at the bottom of the vessels. In the vessel 28 which is pin jointed at 33 to the lever 29, there projects through the bottom of said vessel a rigid tube 34 extending approximately to the lid of the vessel 28. This rigid tube 34 is connected by a flexible tube 36 with an opening 35 leading to the interior of the plug.

The vessel 27 is partly filled with mercury. The lever 29 is fitted with its pivot 37 to a stationary part 38. On that part of the lever 29 which is opposite to the vessel 28 a sliding weight 39 is provided which serves for compensating the weight of the unfilled vessel 28. On this side further, the end 40 of the lever 29 is connected by a chain or rope 41 with the eye or lug 42 of the bolt 23 which is under the action of the spring 22. The chain or rope 41 in this case runs over a roller 44 fitted on the standard 43.

As both the connecting socket 10 and also the passage 15 through the plug 12 are designed in the form of a Venturi nozzle, there is, as is well known, between the connecting points 31 and 35 of the tubes 30 and 36 a difference of pressure. It is assumed that the steam flows through the plug 15 from the left hand connection 10 to the right. If then, on the right side of the plug 12, a breakage takes place in the fluid main 45 (for example a steam way) then the mercury which is usually for the most part contained in the vessel 27 is, by the effect of the increased difference of pressure, forced through the flexible tube 42 into the vessel 28 suspended at 33 to the lever 29, so that the vessel 28 becomes heavier and moves upwards the lever arm which is provided with the compensating weight 39. Thereby the bolt 21 which is connected with this lever arm by the rope or the chain 41 is, antagonistically to the spring 22, drawn out of the recess 24 in the lever 20 and the latter thus released. Consequently the lever 20 under the action of the weight 21 moves downwards by an angle of 90 degrees until it lies against the stop 26. In this way the plug 12 is brought into its shut off position, in which it shuts off the flow of the fluid through its passage 15 from the right to the left side. In this closed position, therefore, there only passes through the slit existing between the connection 10, the casing 11, and the plug 12, and the ball or barrel bearings 14, a small quantity of the fluid from left to right, which, however, is not sufficient for example in the case of steam to produce a complete exhaust of the boiler.

In ordinary operation, furthermore, this quantity of steam passing in the shut off position of the plug 12 through the slit between the connecting socket 10, the casing 11, and the plug 12 is not sufficient to cause an engine connected up to the steam way 45 but not shown on the drawing, to start, or an engine already in operation to race.

The automatic operation of the plug 12 by the lever 20 however, also takes place on breakage of the fluid main on the left side of the plug 12, because owing to the Venturi action, there is the same difference of pressure between the openings 30 and 35, and consequently the effect of the automatic operating device is the same as was described above. This is particularly important in those cases in which the device is interposed in the connection pipe between two boilers.

Needless to say, this control device can also be used for the purpose of grading to any desired degree the quantity of driving fluid supplied to an engine or the like.

I claim:

1. A fluid controlling device comprising, in combination, a casing, an undivided cock plug, coaxial pivots on said undivided cock plug, roller bearings in said casing for supporting said pivots, a permanent clearance between said casing and said undivided cock plug in all positions of the latter, and a full Venturi passage in the body of said undivided cock plug.

2. A fluid controlling device comprising, in combination, a casing, an undivided cock plug, coaxial pivots on said undivided cock plug, roller bearings in said casing for supporting said pivots, a constant clearance between said casing and said undivided cock plug in all positions of the latter, a full Venturi passage in the body of said undivided cock plug, and outwardly flared pipe connecting members adapted to register with said Venturi passage in the undivided cock plug.

BERNHARD KRÄMER.